United States Patent
Schmitt

(10) Patent No.: US 12,162,164 B2
(45) Date of Patent: Dec. 10, 2024

(54) GROWING SYSTEM AND METHOD

(71) Applicant: FARM3, Verrieres de Joux (FR)

(72) Inventor: Romain Schmitt, Paris (FR)

(73) Assignee: FARM3, Verrieres de Joux (FR)

( * ) Notice: Subject to any disclaimer, the term of this patent is extended or adjusted under 35 U.S.C. 154(b) by 332 days.

(21) Appl. No.: 17/622,452

(22) PCT Filed: Jun. 30, 2020

(86) PCT No.: PCT/EP2020/068387
§ 371 (c)(1),
(2) Date: Dec. 23, 2021

(87) PCT Pub. No.: WO2021/001361
PCT Pub. Date: Jan. 7, 2021

(65) Prior Publication Data
US 2022/0250246 A1   Aug. 11, 2022

(30) Foreign Application Priority Data

Jul. 1, 2019   (FR) ..................................... 1907253

(51) Int. Cl.
*B25J 9/16*   (2006.01)
*A01G 9/02*   (2018.01)
(Continued)

(52) U.S. Cl.
CPC ............ *B25J 9/1679* (2013.01); *A01G 9/023* (2013.01); *B25J 13/006* (2013.01); *A01G 9/08* (2013.01); *H04N 7/183* (2013.01)

(58) Field of Classification Search
CPC ....... B25J 9/1679; B25J 13/006; A01G 9/023; A01G 9/08; H04N 7/183
See application file for complete search history.

(56) References Cited

U.S. PATENT DOCUMENTS

2002/0088173 A1   7/2002 Hessel et al.
2012/0324788 A1   12/2012 Sakura et al.
(Continued)

FOREIGN PATENT DOCUMENTS

| WO | WO-2013082648 A1 * | 6/2013 | ............... G06K 9/00 |
| WO | WO-2018068042 A1 * | 4/2018 | ............. A01G 31/02 |
| WO | WO-2019222860 A1 * | 11/2019 | |

OTHER PUBLICATIONS

International Search Report issued on Sep. 16, 2020, in corresponding International Application No. PCT/EP2020/068387; 6 pages (with English Translation).

*Primary Examiner* — Jason Holloway
*Assistant Examiner* — Christopher A Buksa
(74) *Attorney, Agent, or Firm* — Maier & Maier, PLLC

(57) ABSTRACT

A growing system, which includes: at least one growing space having different locations for plants, a robotic arm provided with at least one tool, and a moving element arranged to move the robotic arm between the different location; an electronic and/or computerized communication element; and a remote control station which is at a distance from the at least one growing space and includes a control element arranged to control the robotic arm in each growing space via the communication element, the control element being arranged to control the moving element so as to move the robotic arm in the growing space between the different locations in the growing space and/or to control actions of the robotic arm in said growing space. Also, a corresponding method utilizing the growing system.

23 Claims, 5 Drawing Sheets

(51) Int. Cl.
*A01G 9/08* (2006.01)
*B25J 13/00* (2006.01)
*H04N 7/18* (2006.01)

(56) References Cited

U.S. PATENT DOCUMENTS

2018/0014471 A1    1/2018   Jensen et al.
2018/0146618 A1    5/2018   Elazary et al.
2019/0021238 A1    1/2019   Alexander et al.

* cited by examiner

GROWING SYSTEM AND METHOD

FIELD

The present invention relates to a growing system. It also relates to a growing process. Such a system allows a user to grow plants.

The field of the invention is more particularly but in a nonlimiting manner that of vertical growing.

BACKGROUND

US 2012/324788 A1 describes an apparatus for cultivating plants, in which several storage shelves are superimposed to save space.

US 2002/088173 A1 describes an automated system for providing a continuous yield of fresh agricultural products.

US 2018/146618 A1 describes robots for the autonomous harvesting of hydroponic crops with different harvesters.

Vertical growing defines the growing of plants in tubs arranged one above the other, typically up to 10 meters high.

Under these conditions, the maintenance of plants located at height requires for the cultivator a ladder or a forklift which has the following drawbacks:
- this is not very comfortable for the exercise of his work,
- this can be dangerous, and
- this represents a waste of space in the farm necessary to let it handle.

In the event that the farm is made up of several alleys of plants, it is also necessary to leave a space between the rows of plants to allow the movement of the cultivator and the machine which allows him to climb to the bins at heights (minimum 1 m between each row).

In the case of a soilless and pesticide-free growing, there is also the following drawback:
- plants are all the more vulnerable to pathogens (viruses, bacteria, larvae) which are transported by the air or carried by the farmer.

It is possible to add a sterilization lock to prevent contamination of the plants, but this has the following drawbacks:
- this implies a loss of space,
- this implies complexity for the grower and
- this implies a waste of time on his work.

In a concept where small farms are meant to be deployed in very diverse places around the world, this would require finding farmers there and training them, but this has the following drawback:
- this limits the deployment of farms to countries where labor is already available.

However, by eliminating this bias, we could deploy farms in deserts where the small population does not have access to certain foodstuffs (by an unfavorable climate for example).

The aim of the present invention is to resolve or reduce at least one of the aforementioned drawbacks.

SUMMARY

This objective is achieved with a growing system, comprising:
- at least one growing space comprising:
  - different locations, preferably for plants,
  - a robotic arm, preferably equipped with at least one tool
  - moving means arranged to move the robotic arm between these different locations
- electronic and/or computer communication means,
- a control station remote from the at least one growing space and comprising control means arranged to control the robotic arm of each growing space via the communication means, the control means being arranged to control the moving means so as to move the robotic arm of this growing space between the different locations of this growing space and/or to control actions of the robotic arm of this growing space.

Each growing space preferably further comprises viewing means arranged to capture an image of the locations and/or the robotic arm of this growing space, the control station comprising display means arranged to display this image.

The display means preferably comprise a helmet and/or glasses designed to display the image to a user.

The control means preferably comprise the helmet and/or the glasses, arranged to move the viewing means according to a movement of the helmet and/or glasses.

The viewing means preferably comprise a camera arranged on the robotic arm, preferably at the end of the robotic arm equipped with at least one tool. The viewing means are preferably arranged to image objects in the absence of visible radiation of between 400 and 800 nm. The viewing means may be arranged to capture an image of the locations at a solid angle of at least $2\pi$ steradians, preferably at a solid angle of $4\pi$ steradians.

The control means preferably comprise means for controlling a movement of the robotic arm between the different locations, vertically and/or horizontally.

The at least one growing space is preferably a vertical growing space, comprising at least one vertical stack of plant locations, preferably several rows of vertical stacks of plant locations.

The moving means preferably comprise horizontal rails and/or vertical rails along which the robotic arm is arranged to move.

The at least one growing space is preferably an enclosed space. The at least one growing space preferably comprises means for regulating and/or means for measuring at least one physical parameter within this growing space, such as a temperature, a humidity, a $CO_2$ rate, a spectrometry measurement, a luminosity, and/or an ethylene rate.

The display means are preferably furthermore arranged to display the at least one measured physical parameter.

Each growing space preferably includes a drawer arranged to switch between:
- an internal position for which the container of the drawer is accessible from inside this growing space but inaccessible from outside of this growing space, and
- an external position for which the container of the drawer is accessible from outside this growing space but inaccessible from inside this growing space, the robotic arm of this growing space being preferably arranged to pick plants and/or products in this growing space and deposit them in the container of the drawer in its internal position, the drawer preferably further comprising sterilization means arranged to sterilize the container of the drawer, preferably by ultraviolet radiation, when the drawer passes from its external position to its internal position.

The system according to the invention preferably comprises several distinct growing spaces, the control station being shared for all the growing spaces.

The system according to the invention preferably further comprises:
- means for building a database comprising, for each plant and/or product of a plant, a monitoring over time:
  - of images of this plant and/or product, and/or
  - of physical parameters measured on this plant or product, and means for determining a status of this plant or product and/or a recommended action for this plant or product from the data in the database.

The system according to the invention preferably comprises means for analyzing actions, on the plant or product, of a user of the control station, and computer and/or electronic learning means of a recommended action to be performed on a plant or product depending on its status.

The control means are preferably arranged to control the robotic arm according to the recommended action without the intervention of a user.

The display means are preferably further arranged to display the status or recommended action relating to the plant or product imaged by the display means.

Each plant is preferably identified in the at least one growing space by a bar code.

According to another aspect of the invention, it is proposed a growing method implemented in a system comprising:
- at least one growing space comprising:
  - different locations, preferably for plants,
  - a robotic arm, preferably equipped with at least one tool
  - moving means arranged to move the robotic arm between these different locations
- electronic and/or computer means of communication,
- a control station remote from the at least one growing space and comprising control means.

Said method preferably comprising the following steps a control, by the control means, of the robotic arm of the at least one growing space via the communication means, comprising:
  a) a command, by the control means, of the moving means so as to move the robotic arm of this growing space between the different locations of this growing space and/or
  b) a command, by the control means, of actions of the robotic arm of this growing space, said actions comprising a manipulation, by the robotic arm, of the plants and/or products of these plants arranged in the locations.

Each growing space preferably further comprises viewing means capturing an image of the locations and/or the robotic arm of this growing space, the control station comprising display means displaying this image.

The display means preferably comprise a helmet and/or glasses displaying the image to a user.

The control means preferably comprise the helmet and/or the glasses, the method preferably further comprising a displacement of the viewing means as a function of a movement of the helmet and/or the glasses.

The viewing means preferably comprise a camera arranged on the robotic arm, preferably at the end of the robotic arm equipped with at least one tool. The viewing means preferably image objects in the absence of visible radiation of between 400 and 800 nm. The viewing means may capture an image of the locations at a solid angle of at least $2\pi$ steradians, preferably at a solid angle of $4\pi$ steradians.

The control means preferably control a movement of the robotic arm between the different locations, vertically and/or horizontally.

The at least one growing space is preferably a vertical growing space, comprising at least one vertical stack of plant locations, preferably several rows of vertical stacks of plant locations.

The moving means preferably comprise horizontal rails and/or vertical rails along which the robotic arm moves.

The at least one growing space is preferably an enclosed space.

The at least one growing space preferably comprises means which regulate and/or measure at least one physical parameter within this growing space, such as a temperature, a humidity, a $CO_2$ rate, a spectrometry measurement, a brightness, and/or an ethylene rate.

The display means preferably display the at least one measured physical parameter.

Each growing space preferably includes a drawer that goes between:
- an internal position for which the container of the drawer is accessible from inside this growing space but inaccessible from outside this growing space, and
- an external position for which the container of the drawer is accessible from outside this growing space but inaccessible from inside this growing space the robotic arm of this growing space picking plants and/or products in this growing space and depositing them in the container of the drawer in its internal position the drawer preferably further comprising sterilization means sterilizing the drawer container, preferably by ultraviolet radiation, when the drawer moves from its external position to its internal position.

The method according to the invention is preferably implemented in a system comprising several distinct growing spaces, the control station being shared for all the growing spaces.

Preferably, in the method according to the invention:
- means build a database comprising, for each plant and/or product of a plant, a monitoring over time:
  - of images of this plant and/or product, and/or
  - of physical parameters measured on this plant or product, and
- means determine a status of this plant or product from the data in the database.

Preferably, the method according to the invention comprises an analysis of the actions, on the plant or product, of a user of the control station, and computer and/or electronic learning of a recommended action to be performed on a plant or product, depending on its status.

Preferably, the control means control the robotic arm according to the recommended action without the intervention of a user.

Preferably, the display means further display the status or recommended action relating to the plant or product imaged by the display means.

Each plant is preferably identified in the at least one growing space by a bar code.

BRIEF DESCRIPTION OF THE DRAWINGS

Other advantages and features of the invention will become apparent on reading the detailed description of implementations and embodiments which are in no way limiting, and from the following appended drawings.

DETAILED DESCRIPTION

Figure 1:
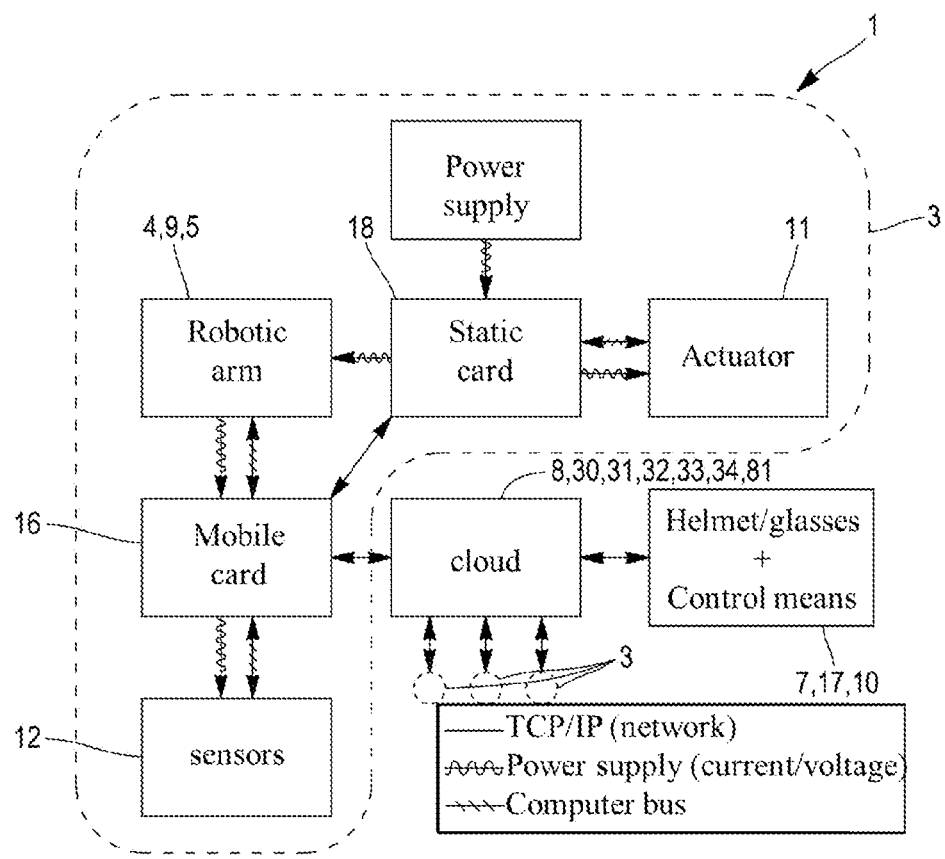
FIG. 1 is a schematic view of a first embodiment of system 1 according to the invention, which is the preferred embodiment of the invention.
Figure 2:
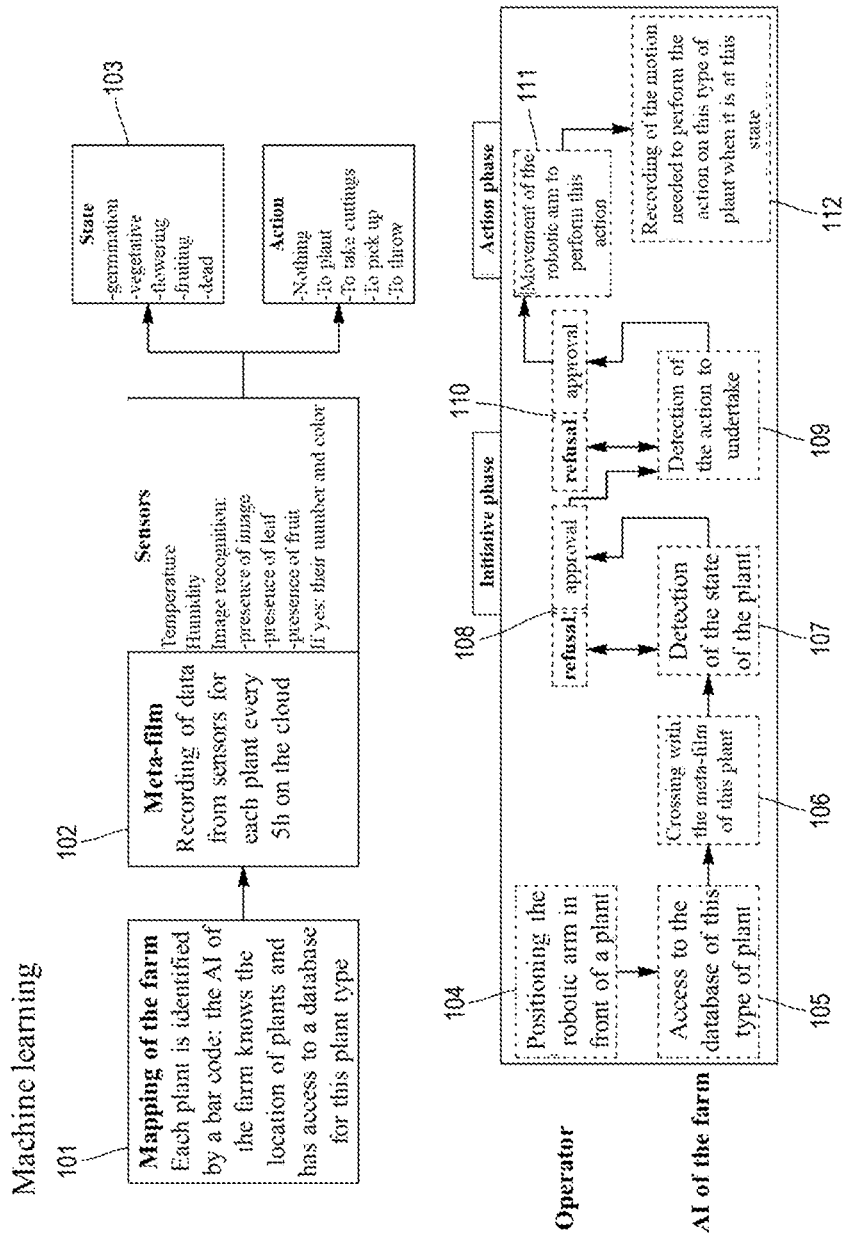
FIG. 2 is a schematic view of a learning method implemented by the first embodiment of system 1 according to the invention.
Figure 3:
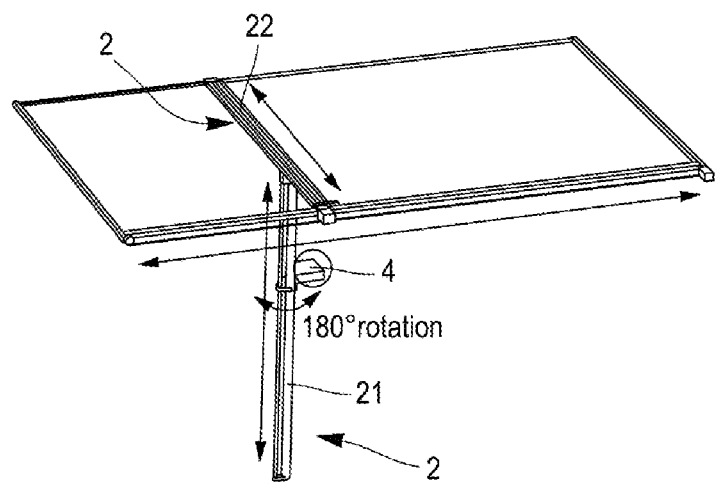
FIG. 3 is a perspective view of moving means 2 of the system 1.

Since these embodiments are in no way limiting, it is possible in particular to consider variants of the invention comprising only a selection of characteristics described or illustrated below isolated from the other characteristics described or illustrated (even if this selection is isolated within of a sentence comprising these other characteristics), if this selection of characteristics is sufficient to confer a technical advantage or to differentiate the invention from the state of the prior art.

This selection comprises at least one preferably functional characteristic without structural details, and/or with only part of the structural details if this part alone is sufficient to confer a technical advantage or to differentiate the invention from the state of the art. earlier.

We will first of all describe, with reference to FIGS. 1 to 8, a first embodiment of the system according to the invention 1.

A growing space 3 will be described below, considering that all the growing spaces 3 include the same characteristics as the growing space 3 described below and that the description of the system 1 or method according to the invention will remain valid by replacing the growing space 3 or farm 3 by "at least one farm or growing space" or "each farm or growing space".

The growing space 3 includes different locations 6 for plants.

Figure 4:
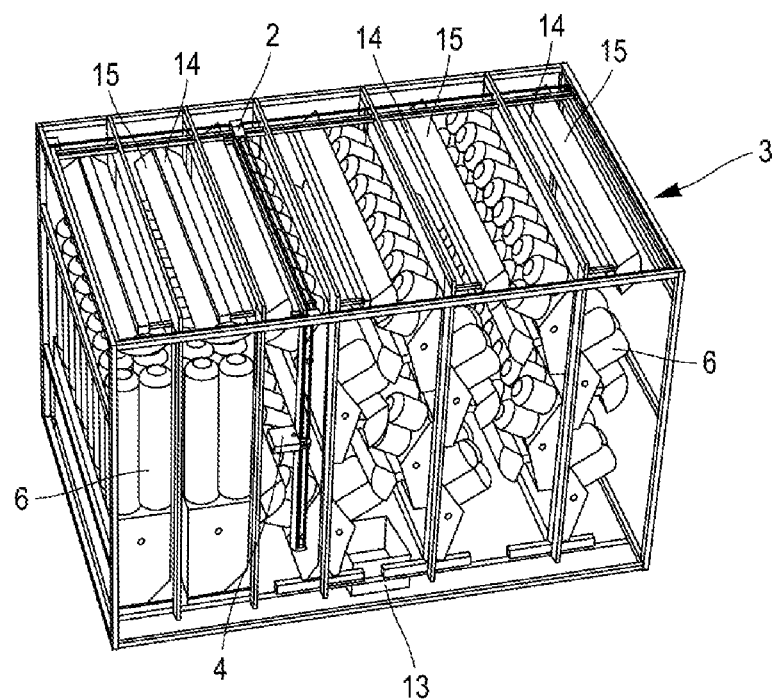
FIG. 4 is a perspective view of a growing space 3 of the system 1.

In FIG. 4, each cylindrical shape referenced 6 illustrates a maximum occupancy volume provided for the plant located at this location 6.

In FIG. 4, it is also noted that the growing space 3 comprises light sources 14 (typically comprising Electro Luminescent Diodes or LEDs) arranged to emit light 15, comprising at least one wavelength between 400 nm and 800 nm, preferably at least one wavelength between 410 nm and 490 nm and/or between 560 nm and 660 nm, preferably at least one wavelength between 410 nm and 490 nm and at least one wavelength wave between 560 nm and 660 nm.

The growing space 3 comprises a robotic arm 4 equipped with at least one tool 5.

The at least one tool 5 includes:
gripping means arranged to handle plants and/or products of these plants arranged in the locations 6, and/or
at least one gardening tool 5 among scissors, basket, saw, tongs, fruit cage, etc.

The farm 3 includes several tools 5 which are interchangeable on the robotic arm 4. By robotic arm is meant a set of mechanical parts connected by at least one articulation, the movement of which is provided by at least one motor. The arm 4 is an arm comprising 6 degrees of freedom. The arm is for example based on a "DOBOT® Magician" reference arm. It weighs about 3 kg. It is retractable, and has a retracted length of 15 cm and an extended length of 84 cm. It can lift about 300 g. It is equipped with the viewing means 9 described below. The arm 4 is equipped with sensors 12 described below, including for example a temperature sensor, a $CO_2$ sensor, a humidity sensor, a light sensor, and/or a fruit maturity sensor (by spectrometry).

The sensors 12 on board the arm 4 are thus as close as possible to the locations 6.

The growing space 3 comprises moving means 2 arranged to move the robotic arm 4 between these different locations 6.

The growing system 1 comprises electronic and/or computer communication means 8. The communication means 8 include, for example, cloud computing or cloud computing means.

The growing system 1 comprises a control station 7 remote from the growing space 3 and comprising control means 17 arranged to control the robotic arm 4 of the growing space 3 via the communication means 8, the control means 17 being arranged to control the moving means 2 so as to move the robotic arm 4 of this growing space 3 between the different locations 6 of this growing space 3 and/or to control actions (such as grabbing an object, handle (and/or plant, cuttings, pick, throw away) a plant and/or a product of a plant, take a measurement by a sensor 12 on board the arm 4, actuate a tool 5 of the arm 4, etc.) of the robotic arm 4 of this growing space 3.

Farm 3 and control station 7 are remote.

The means of communication 8 connect the farm 3 and the control station 7.

Remote control saves space in farm 3 (there is no human needed in face-to-face in farm 3). It also helps prevent the entry of pathogens and pesticides that could enter with the back-and-forth trips made by farmers.

The growing space 3 further comprises viewing means 9 arranged to capture an image of the locations 6 and/or of the robotic arm 4 of this growing space 3, the control station 7 comprising display means 10 arranged to display this image.

These viewing means 9 comprise a camera, for example with the reference "intelrealsense D435i®". Camera 9 is a three-dimensional or "3D" camera which sees:
at least 180° (i.e., which images at least $2\pi$ steradians) or at 360° (i.e., which images $4\pi$ steradians) at the end of robotic arm 4, the cultivator user can then see between the leaves of space 3 from the control station 7, which would be impossible in person, where he would only see the surface of the canopy, or
at less than 180° (i.e., which image minus $2\pi$ steradians), to reduce the latency times of the display of the image on the display means 10.

The display means 10 comprise a helmet and/or glasses (typically a virtual reality device) designed to display the image to a user on this helmet and/or on these glasses. The use of virtual reality headset 10 allows immersion in the farm and a visit thereof by users who would like to see how it works in real time. This can be used as a marketing or educational object.

The display means 10 and/or the means 30, 31, 32, 33, and/or 34 can modify or be arranged to modify the image captured by the viewing means 9 before displaying it, typically so that the walls and/or elements or structures of farm 3 are modeled in three dimensions (to give the impression, for example, of being in a space larger than it appears and/or lit by natural light) and/or so that the only dynamic object transcribed in real time is the plant imaged at its location 6 by viewing means 9. The user can therefore choose, by connecting to farm 3, the plant he wishes to take care of, via a menu displayed on display means 10. It then appears in front of him, in a live stream. To integrate into this virtual environment, the plant is cut from the live feed (or "live feed") and inserted into the virtual environment.

The growing space 3 is a vertical growing space, comprising at least one vertical stack of locations 6 for plants, preferably several rows of vertical stacks of locations 6 for plants. Each vertical stack is typically 3 meters high.

The moving means 2 comprise horizontal rails and/or vertical rails along which the robotic arm 4 is arranged to move by means of motors. This eliminates the problem of space in height, by allowing the arm 4 to rise from the ground level up to several meters high. To eliminate the problem of space between the rows of plants, the first vertical rail 21 is itself removable, on a horizontal rail 22 on the ceiling, and can thus move from right to left. It is therefore sufficient to leave a space of 30 cm for the rail and the arm 4 to pass between the rows of plants.

The rails 21 are typically metallic, preferably stainless steel.

The control means 17 include:
the helmet and/or the glasses 10, arranged to move the viewing means 9 (typically in rotation) as a function of a movement (typically in rotation) of the helmet and/or glasses; the helmet 10 is connected directly to the camera 9 placed on the arm 4. Moving the helmet 10 moves the view of the camera 9 and allows a 360° view up/down and right/left, and/or
means (typically manual) for controlling a movement (typically in translation) of the robotic arm 4 between the different locations 6, vertically and/or horizontally. The means 17 typically comprise a lever arranged to control the motors on the rails 21, 22, and therefore allows the arm 4 to go from right to left and from top to bottom.
means (typically manual) for controlling an action of the robotic arm 4. The means 17 typically include:
another lever arranged to control the arm 4 and its tool 5 (for example to tighten the equipped tool 5 (close the scissors, pinch the pliers etc.)) and/or to control a retraction or not of the arm 4 (typically over 60 cm in length) to more or less insert arm 4 between the plants in the same row, and
a 6-axis joint, one-handed grip type, arranged to choose with more precision the place where to apply the tool 5.

With this system the user has a view throughout the farm 3 and access to each plant or location 6.

The viewing means 9 comprise the camera placed on the robotic arm 4, preferably at the end of the robotic arm 4 equipped with at least one tool 5.

The viewing means 9 are arranged to image objects in the absence of visible radiation between 400 and 800 nm.

The viewing means 9 typically comprise an infrared camera.

The growing space 3 is an enclosed space. Thus, the arm 4 is not configured to leave the space 3, and no human needs to enter it. Thus, no pathogen can enter space 3 because space 3 is completely closed (apart from at least one drawer 13 and the necessary vents which are treated with ultraviolet radiation).

The growing space 3 comprises regulating means or actuators 11 and/or measuring means or sensors 12 of at least one physical parameter within this growing space 3, such as temperature, humidity, temperature, $CO_2$ rate, spectrometry measurement, luminosity, and/or ethylene rate.

The growing space 3 comprises mobile electronic means 16, also called mobile card 16.

The growing space 3 comprises electronic means 18 called static, also called static card 18.

Typically, each of the cards 16, 18 comprises at least one computer, a central or computing unit, an analog electronic circuit (preferably dedicated), a digital electronic circuit (preferably dedicated), and/or a microprocessor (preferably dedicated), and/or software resources.

The mobile card 16 is so called because it is associated with the mobile robotic arm 4.

The card 16 is designed to serve as an interface between the sensors 12 and the communication means 8, 81.

The sensors 12 can thus be as close as possible to or in contact with each plant.

The card 16 sends data from sensors 12 to Cloud 81.

The card 16 indicates the activation thresholds (minimum and maximum) of actuators 11 to static card 18.

The card 16 controls motorized arm 4.

The mobile card 16 is typically a "Raspberry Pi Zero W" ® reference card.

Sensors 12 typically include:
a $CO_2$ sensor, for example with reference T6713 from the company "Am phenol" ®, and/or
a spectrometer, and/or
a temperature sensor, for example with reference MIKROE-2937 from the company Shenzhen Feisi Diya Technology Co., Ltd., and/or
a brightness sensor, for example reference MIKROE-1903 from the company Shenzhen Zhaoxing Microelectronics Co., Ltd, and/or
an ethylene sensor, for example reference MQ-3 from the company "Waveshare®", and/or
a humidity sensor, for example reference MIKROE-2937 from the company Shenzhen Feisi Diya Technology Co., Ltd.

The static card 18 is arranged to activate the actuators 11 disseminated in the farm 3 when the records of the sensors 12 require it. The card 16 is designed to serve as an interface between the actuators 11 and the communication means 8 and/or the sensors 12.

The card 18 controls the power supply to all elements of farm 3.

The actuators 11 typically comprise a $CO_2$ pump, means for regulating the temperature (an air conditioner and/or a heater), means for regulating the brightness (i.e., means for controlling sources 14), means for regulating humidity (i.e., typically air circulation pump with controlled humidity and/or humidity diffuser), and/or means for regulating $CO_2$ or ethylene (i.e., typically fresh air circulation pump and/or source of $CO_2$ and/or ethylene).

The card 18 is typically a "DEV-13907 SparkFun ESP32 Thing" reference card.

The display means 10 are furthermore arranged to display the at least one measured physical parameter.

The growing space 3 includes at least one drawer 13. Each drawer 13 is arranged to pass between:
an internal position for which the container of the drawer 13 is accessible from inside this growing space 3 but inaccessible from outside this growing space 3, and
an external position for which the container of the drawer 13 is accessible from outside this growing space 3 but inaccessible from inside this growing space 3, the robotic arm 4 of this growing space 3 being arranged to pick plants and/or products in this growing space 3 and deposit them in the container of the drawer 13 in its internal position the drawer 13 further comprising sterilization means arranged to sterilize the container and/or the contents of the drawer 13, preferably by ultra violet radiation (i.e. by at least one wavelength between 10 nm and 380 nm, preferably between 180 nm and 380 nm), when the slide 13 moves from its external position to its internal position.

This decontamination is therefore arranged to destroy bacteria and/or viruses inside the drawer 13.

The at least one drawer 13 can include:
at least one refrigerated drawer 13 i.e., arranged to maintain the container of the drawer 13 at a temperature below a threshold value; typically less than 12° C., preferably less than 5° C., for plants or products to be preserved or consumed, and/or
at least one non-refrigerated drawer 13, for waste.

The system 1 comprises several separate growing spaces 3, the control station 7 being shared for all growing spaces 3.

In other words, the same control station 7, remote from each growing space, comprises the same control means 17 which are arranged to control the robotic arm of each growing space via the means of communication, the control means being arranged to control the moving means so as to move the robotic arm each growing space between the different locations of this growing space and/or to control actions of the robotic arm of each growing space.

Each growing space 3 is an enclosed space separate from each of the other growing spaces 3.

Each growing space 3 is distant from each of the other growing spaces 3 by a distance of at least 10 meters, preferably at least 1 km, more preferably at least 10 km.

In some embodiments, each growing space 3 is even distant from each of the other growing spaces 3 by a distance of at least 100 km or 1000 km.

System 1 further includes:
means 31 for building a database comprising, for each plant and/or product of a plant, monitoring over time (in the form of a meta-film):
images of this plant and/or product, and/or
physical parameters measured on this plant or product, and
means 32 for determining a status of this plant or product and/or a recommended action for this plant or product from the data in the database.

A meta-film is therefore a sub-part of the database.

The system comprises means 33 for analyzing actions, on the plant or product, of a user of the control station 7, and means 34 for computer and/or electronic learning of a recommended action to be performed on a plant or produced according to its status.

Preferably, all the means 31, 32, 33, and 34 comprise the same technical means 30.

Typically, each of the means 30, 31, 32, 33 and 34 comprises at least one computer, a central or computing unit, an analog electronic circuit (preferably dedicated), a digital electronic circuit (preferably dedicated), and/or a microprocessor (preferably dedicated), and/or software means.

The means 30 typically comprise an Artificial Intelligence (AI) 30 stored in the communication means 8 (i.e., on the Cloud 81).

The control means 17 and/or AI 30 are arranged to control (if applicable) the robotic arm 4 according to the recommended action without the intervention of a user of the station 7.

The display means 10 are furthermore arranged to display the status or the recommended action concerning the plant or product imaged by the viewing means 9.

Each plant is identified in the growing space 3 by a barcode.

Figure 5:
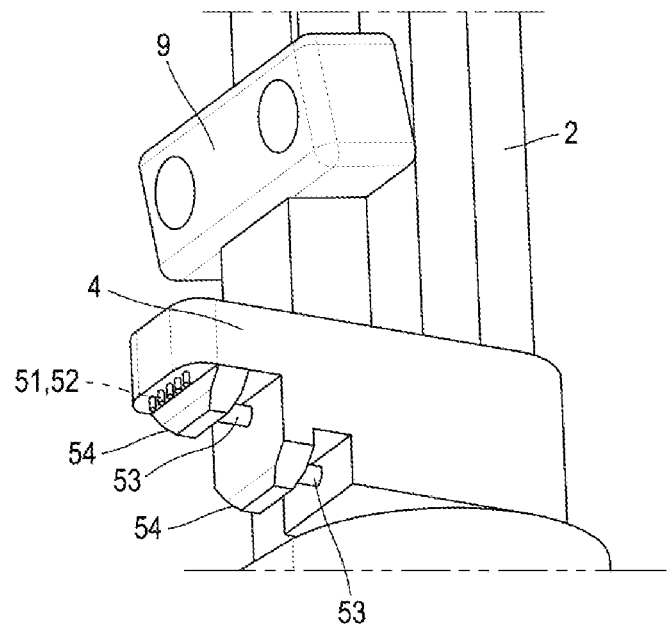
FIG. 5 is a perspective view of a robotic arm 4 of the system 1.

As illustrated in FIG. 5, the arm 4 comprises a connector 51 arranged to connect and fix a tool 5 to the arm 4 among the different tools 5 available. The connector 51 includes electrical connections 52 for supplying electric power and sending control signals to the tool 5 connected to the arm 4. The connector 51 comprises at least one latch 53 (typically coil latch) for keeping the tool 5 connected to the arm 4 fixed to the arm 4. The connector 51 comprises at least one form of centering 54 to facilitate centering of the tool 5 connected to the arm 4.

The tool 5 is interchangeable directly in the farm 3, which makes it possible to develop the applications of the arm 4 at the same time as the applications of the farm 3.

A volume on the path of the moving means 2, 21, 22 transporting the arm 4 is allocated to changing the tool 5: the arm 4 places the tool used 4 in this dedicated volume, it dissociates from it, then seizes itself of the new tool 5 before binding to it.

Figure 6:
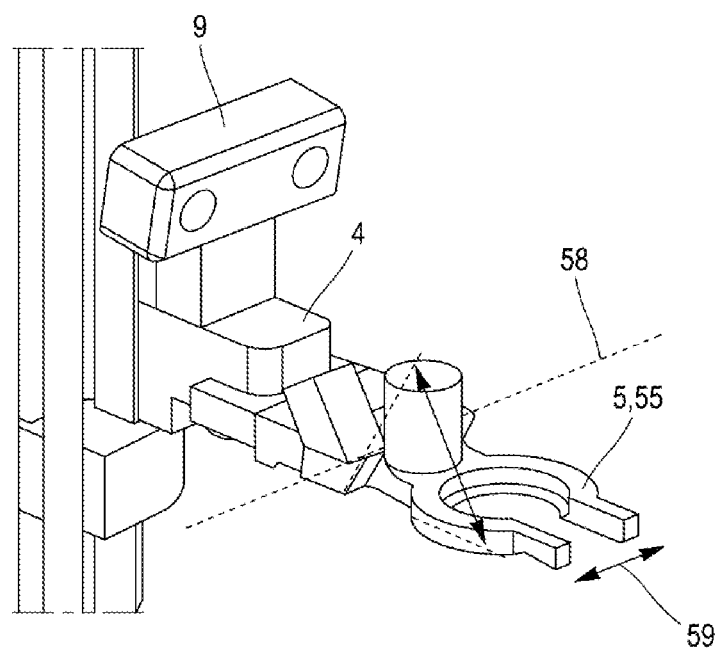
FIG. 6 is a perspective view of the robotic arm 4 of the system 1, equipped with a first variant of tool 5.
Figure 7:
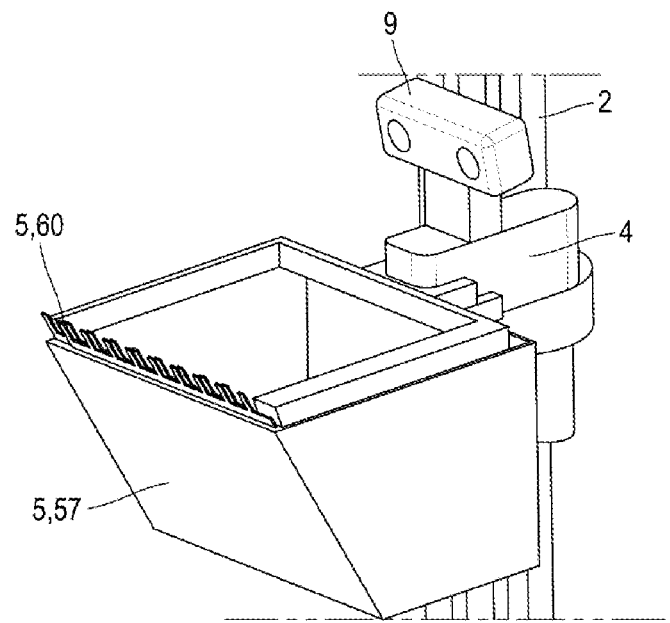
FIG. 7 is a perspective view of the robotic arm 4 of the system 1, equipped with a second variant of tool 5.
Figure 8:
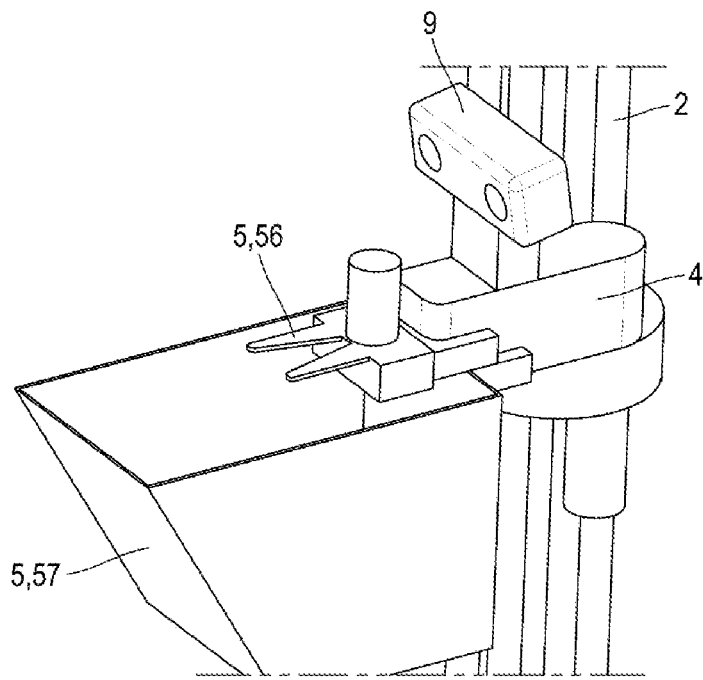
FIG. 8 is a perspective view of the robotic arm 4 of the system 1, equipped with a third variant of the tool 5.

The 5 tools available in farm 3 include for example:
clamps 55 (as illustrated in FIG. 6). A motor makes it possible to change the inclination of the clamp 55 around an axis of rotation 58. A motor makes it possible to vary the opening 59 of the clamps. The clamp 55 allows:
to grab the baskets in which the plants grow to lift them and check the condition of the roots and the plumbing various maintenance operations in farm 3
to grab the seeds in a special packaging to be grabbed by this tip. The packaging must simply be placed in the growing basket to activate the germination of the seed
motorized scissors 56 combined with a basket 57 (as illustrated in FIG. 8) and/or wide motorized blades 60 combined with a basket 57 (as illustrated in FIG. 7): this allows the cuttings and the picking of aromatics (the herbs are collected by the basket and placed in a drawer 13 provided with a cooler and intended for crops), the weeds are collected by the basket 57 and thrown (via at least one drawer 13) outside the farm so as not to not let them rot.

The arm 4 is therefore capable of planting, cutting, picking and maintaining by means of a remote pilot.

We will now describe a first embodiment of the growing and/or learning method according to the invention, implemented in the system 1.

This embodiment comprises the following steps for a growing space 3 (also called farm 3 in the present description) given of the system 1.

This growing space 3 regulates (by actuators 11) and/or measure (by sensors 12) at least one physical parameter within this growing space 3, such as temperature, humidity, $CO_2$ rate, a spectrometry measurement, a luminosity, and/or an ethylene rate.

For example, if the optimal growing conditions do not match the conditions in farm 3 (the temperature drops, the light is turned off for too long etc.), the AI 30 automatically activates the actuators 11 disseminated in farm 3 to restore normal conditions. If nothing changes within the hour, it deduces that there is a malfunction and sends an alert message to the operator.

Each measured parameter is stored in the database.

In the mapping step 101, each plant is identified in at least one growing space 3 by a bar code. Farm 3 is organized so that each plant is identified by a geographical location 6 entered manually by the user (for example, row 2, bin 3, plant 4=tomato) from the control station 7, and at each new species the user (also called operator or cultivator or farmer or user or pilot in the present description) completes the database and can manually enter information (species, optimum temperature, required brightness etc.). Other data will be added by Artificial Intelligence (AI) as it learns for this species, as explained below.

The means 9 know the path of the robotic arm 4 (to which they are attached) and all the possible locations 6 of plants within the farm 3. Each of these locations is identified in the database as empty or busy. In the event that a plant grows there, the bar code identifying it read by means 9, makes it possible to mention automatically, and not manually, location, date of planting and type of plant (example: row 2, tray 3, plant 4=beef heart tomato, planted Sep. 3, 2019). However, the user can modify/supplement the database manually.

A step 102 of constructing a meta-film is carried out periodically, for example every 5 hours. During each iteration of step 102, robotic arm 4 automatically moves through farm 3 and analyzes each plant. At each iteration of step 102, the following are recorded (step 103) in the meta-film for each plant or location 6:
 at least one photo of the plant,
 information (number, color, and/or size) on a recognition of at least one product (said product typically being a stem, leaf, fruit, vegetable, root, onion, and/or flower) of this plant; and or
 information on a stage or status of the plant (one among germination, vegetative, flowering, fruiting, death); and or
 information on a recommended action on the plant (one among nothing, planting, cutting, picking, discarding)); and or
 physical parameters relating to the plant (measured by means 12): humidity, temperature, $CO_2$, maturity.

Image recognition is carried out by learning, when a new element appears, the AI 30 tries to guess its nature, to which the operator can respond remotely with "yes" or "no"
 a) "No" generates another proposition by the AI 30
 b) "Yes" causes the data of this element to be recorded in the matrix of the said plant in order to recognize it later.

For each plant, the meta-film is stored on cloud 81. This information relates to seed growth until death for each plant. A virtual universe can be created with this information to accelerate the learning of the AI 30.

A command of an action by the user, from the control station 7, acts on the growing space 3, this action comprising:
 A displacement of the viewing means 9 of this growing space 3, preferably a rotation of the viewing means 9 as a function of a rotational movement of the helmet and/or the glasses 10 worn by the user, and/or a translation of the viewing means 9 (carried by the arm 4) as a function of a movement on the control means 17 (typically on the joystick) moving the arm 4 and therefore simultaneously the viewing means 9, and/or
 A control, by the control means 17, of the robotic arm 4 of the at least one growing space 3 via the communication means 8, comprising:
  a) a control (step 104), by the control means 17, of the moving means 2 so as to move the robotic arm 4 of this growing space 3 between the different locations 6 of this growing space 3; the control means 17 control a movement of the robotic arm 4 between the different locations 6, vertically and/or horizontally, by moving the arm 4 along the horizontal rails 22 and/or the vertical rails 21 and/or
  b) a control (step 111), by the control means 17, of actions of the robotic arm 4 of this growing space 3, said actions comprising a manipulation, by the robotic arm 4, of the plants and/or products of these plants arranged in locations 6. For example, the robotic arm 4 of this growing space 3 collects plants and/or products in this growing space 3 and places them in the container of the drawer 13 in its internal position; then the drawer 13 passes from its internal position to its external position; then the contents of the drawer 13 are withdrawn from the drawer 13; then the drawer 13 moves from its external position to its internal position and the sterilization means of the drawer 13 sterilize the container of the drawer 13, preferably by ultraviolet radiation, when the drawer moves from its external position to its internal position. This allows the elimination of any contaminants before returning to farm 3.

For example, the operator begins to position (step 104) the arm 4 in front of a plant or location 6 by means of the means 17.

The display means 10 display at least one measured physical parameter and/or a recommended action (determined as described below) and/or data relating to the plant being displayed on the means 10.

The information from the database is displayed on the means 10 of the operator when he looks at the plant in question with the camera 9 of the robotic arm 4, according to an "augmented reality" process. He also has access to information from sensors 12 in real time: for example, he is looking at a tomato, at the top left he sees the species, its date planting, its optimum temperature, etc. at the top right of the screen it can see the current temperature of the farm etc.

The viewing means 9 of this growing space 3 capture an image of the locations and/or the robotic arm 4 of this growing space 3 (even in the absence of visible radiation between 400 and 800 nm), and the display means (i.e., headset and/or glasses 10) display this image to a user. Thus, the camera 9 allows to see the farm 3 even at night (night vision) without disturbing the growth of the plants which could be awakened with only a few photons and could leave the flowering stage to return to the vegetative stage if the light cycles are not respected. The farm 3 is therefore accessible any day of the year and at any time.

When the operator looks at this plant or location 6 via the means 9 and 10, the AI 30 accesses the database (step 105) then analyzes the changes in the meta-film of this plant since its last connection (step 106) and guess (step 107) in which stage the plant is (among the five aforementioned). The operator can then validate (step 108) with "yes" or "no" and this information which is stored in the database of the plant.

The AI 30 then proposes (step 109) an action (among the five aforementioned) recommended for this plant. The operator can then validate (step 110) with "yes" or "no" and this information is stored in the database of the plant. Then (step 111):
 in the event of "yes": the operator controls, by the control means 17, the action of the arm 4 or the control means 17 and/or the AI 30 control the robotic arm 4 according to the action recommended without intervention of" a user of extension 7
 in the event of "no", the operator himself controls, by the control means 17, the action of the arm 4.

The AI 30 then records (step 112) the movement of the robotic arm controlled by the operator for this action (it learns "How to perform the action").

Thus, each plant has a sub-part of the database which is filled as the farms 3 are used and will lead after a few years to a perfect autonomy of the farms for the plants studied by the AI 30. Thus, this embodiment of the method according to the invention comprises learning, said learning comprising:
  a construction of a database comprising, for each plant and/or product of a plant, a monitoring over time:
    of images of this plant and/or product, and/or
    of physical parameters measured on this plant or product, and
  a determination of the status of this plant or product and/or a recommended action for this plant or product from the data in the database.

The learning further comprises an analysis of the actions, on the plant or product, of a user of the control station 7, and computer and/or electronic learning of a recommended action to be carried out on a plant or product as a function of his status.

Following this learning:
  the display means 10 also display the status (step 108) or the action (step 110) recommended concerning the plant or product imaged by the viewing means 9; the user remains in the control station 7, and is helped in his decision to take actions (step 111) himself, or
  the control means 17 and/or the AI 30 control the robotic arm 4 according to the recommended action without the intervention of a user; the user then no longer needs to be present in the control station 7, which corresponds to the autonomy stage of the system 1.

The AI 30, for this learning, recognizes the image, stage, action to be performed, etc. all from data obtained under control and of which we know the desired result. The remote operator observes in real time and can correct/validate the choice of the AI 30. It is therefore a supervised type learning technology, preferably implemented by a neural network.

The AI 30 varies or is arranged to vary the actuators 11 from their initial conditions to itself create a new set of random data (such as for example increasing the temperature, increasing the calcium, etc.). Rewards or punishments are allocated to it based on the result, typically including:
  a punishment if a plant is dead or if less satisfactory results are obtained than with the initial conditions, or
  a reward if the growth of the plant is accelerated, or if the fruits are larger, more colorful (with this set of qualitative data, the farm can exercise these experiments independently).

These results for awarding a punishment or reward may include:
  a score assigned by the operator on the taste of the product after leaving the farm, and/or
  a content of a product in the plant, for example hyperspectral to measure for example the sugar content of the plant, and/or chlorophyll (in herbs) . . . .

It is a reinforcement learning, which can use a known reinforcement learning solution. This learning is much faster with a starting point, that is to say the plant database (entered manually by the operator mainly at the level of climatic and nutritional recipes). For example, we know that the temperature of such a plant is set at 26° C. to have satisfactory growth and the AI 30 can start to vary at 27, 28 or 24, 25° C., the expected results for each condition being probably in a range of data close to the initial data.

This learning by reinforcement, unlike the previous supervised learning, makes it possible to induce stress on the plants (too high temperature for a short time, stop watering, increase in the force of the wind) and to deduce from it those capable of improve the quality of products, and therefore refine the growth conditions initially entered.

Control station 7 is shared for all growing spaces 3. Thus, each of the preceding and/or following stages can be (preferably all the preceding stages are) preferably implemented for all the growing spaces 3.

In particular, the method comprises the following steps:
  a control, by the same control means belonging to the same control station 7, of the robotic arm of each growing space via the means of communication, comprising:
    a) a command, by the control means, of the moving means so as to move the robotic arm of each growing space between the different locations of this growing space and/or
    b) a command, by the control means, of actions of the robotic arm of each growing space, said actions comprising a manipulation, by the robotic arm, of the plants and/or of products of these plants arranged in the locations.

With the help of this system 1, the same user farmer (typically trained in France) can in the comfort of his office take care of multiple growing spaces 3 disseminated anywhere in the world provided that an internet connection allow access to these spaces 3. The farms 3 are connected to each other, and share the software (AI 30) present on the cloud 81. Therefore, the more farms 3 there are, the faster the learning.

Farms 3 are connected to each other by WIFI.

The arm 4 and the camera 9 communicate by WIFI with the virtual reality headset 10 which on which is broadcast a live feed via a virtual reality (VR) application coded in the development environment virtual reality headset 10 (which is typically an "oculus rift" model headset).

The live feed of each camera 9 is sent to the cloud 8, 81 along with the information from the sensors 12.

It is on cloud 8, 81 that the calculations are performed by the AI 30 and the stored database. Then, from the cloud 8, 81 the information is sent to the virtual reality headset 10 to give the user the opportunity to see the plant in 3D and to act on it using the joysticks 17. The video sent to the virtual reality headset 10 is superimposed on the information that helps the operator to make a decision (ethylene reading, from the spectrometer, analysis of the AI 30: plant health, plant stage, size of the fruit, weight of it evaluated by the robotic arm etc.)

Of course, the invention is not limited to the examples which have just been described and numerous modifications can be made to these examples without departing from the scope of the invention.

The invention claimed is:
1. A growing system, comprising:
  at least one growing space comprising:
    different plant locations for receiving plants,
    a robotic arm equipped with at least one tool, and
    a moving device configured to move the robotic arm between the different plant locations, and
  a control station remote from the at least one growing space and comprising a controller configured to control the robotic arm of each growing space, the controller being configured to control the moving device so as to move each robotic arm of the corresponding growing space between the different plant locations of the growing space and/or to control actions of the robotic arm,
  wherein each growing space includes a drawer configured to switch between:

an internal position wherein a container of the drawer is accessible from inside the growing space but inaccessible from outside the growing space, and an external position wherein the container of the drawer is accessible from outside the growing space but inaccessible from inside the growing space, the robotic arm being configured to pick plants and/or products in the corresponding growing space and deposit them in the container of the drawer in its internal position, the drawer further comprising a sterilization device configured to sterilize the container of the drawer, preferably by ultraviolet radiation, when the drawer switches from its external position to its internal position.

2. The growing system according to claim 1, wherein each growing space further comprises an imaging device configured to capture an image of the corresponding plant locations and/or of the corresponding robotic arm, the control station comprising a display configured to display the captured image.

3. The growing system according to claim 2, wherein the display comprises a helmet and/or glasses configured to display the captured image to a user.

4. The growing system according to claim 3, wherein the controller comprises the helmet and/or the glasses, the controller being further configured to move the imaging device according to a movement of the helmet and/or the glasses.

5. The growing system according to claim 2, wherein the viewing device comprises a camera arranged on the robotic arm.

6. The growing system according to claim 5, wherein the viewing device comprises a camera arranged at an end of the robotic arm which is equipped with the at least one tool.

7. The growing system according to claim 2, wherein the imaging device is configured to image objects in the absence of visible radiation between 400 and 800 nm.

8. The growing system according to claim 2, wherein the imaging device is configured to capture an image of the plant locations at a solid angle of at least $2\pi$ steradian.

9. The growing system according to claim 8, wherein the imaging device is configured to capture an image of the plant locations at a solid angle of $4\pi$ steradian.

10. The growing system according to claim 1, wherein the controller is configured to control a movement of the robotic arm between the different plant locations, vertically and/or horizontally.

11. The growing system according to claim 1, wherein the at least one growing space is a vertical growing space, comprising at least one vertical stack of plant locations.

12. The growing system according to claim 11, wherein the at least one growing space is a vertical growing space, comprising a plurality of rows of vertical stacks of plant locations.

13. The growing system according to claim 1, wherein the moving device comprises horizontal rails and/or vertical rails along which the robotic arm is configured to move.

14. The growing system according to claim 1, wherein the at least each growing space is an enclosed space.

15. The growing system according to claim 1, wherein the at least one growing space comprises a regulator and/or a sensor configured to measure at least one physical parameter within the growing space, such as a temperature, a humidity, a $CO_2$ rate, a spectrometric measurement, a luminosity, and/or an ethylene rate.

16. The growing system according to claim 15, wherein each growing space further comprises an imaging device configured to capture an image of the corresponding plant locations and/or of the corresponding robotic arm, the control station comprising a display configured to display the captured image, the display being further configured to display the at least one measured physical parameter.

17. The growing system according to claim 1, wherein the growing system comprises a plurality of distinct growing spaces, the control station being shared for all the growing spaces.

18. The growing system according to claim 1, wherein the controller is further configured to:
store a database comprising, for each plant and/or product of a plant, a monitoring over time:
of images of the plant and/or product, and/or
of physical parameters measured on the plant or product, and determine a status of the plant or product and/or a recommended action for the plant or product from based on data stored in the database.

19. The growing system according to claim 18, wherein the controller is further configured to analyze actions, on the plant or product, of a user of the control station, and learn a recommended action to be performed on a plant or product depending on the status of the plant or product.

20. The system according to claim 18, wherein the controller is configured to control the robotic arm according to the recommended action without an intervention of a user.

21. The growing system according to claim 18, wherein each growing space further comprises an imaging device configured to capture an image of the corresponding plant locations and/or of the corresponding robotic arm, the control station comprising a display configured to display the captured image, the display being further configured to display the status or recommended action relating to the plant or product imaged by the imaging device.

22. The growing system according to claim 1, wherein each growing space includes a bar code to identify the respective plant.

23. A growing method, implemented in a system comprising:
at least one growing space comprising:
different plant locations for receiving plants,
a robotic arm equipped with at least one tool, and
a moving device configured to move the robotic arm between the different plant locations,
a control station remote from the at least one growing space and comprising a controller,
wherein each growing space includes a drawer configured to switch between:
an internal position wherein a container of the drawer is accessible from inside the growing space but inaccessible from outside the growing space, and
an external position wherein the container of the drawer is accessible from outside the growing space but inaccessible from inside the growing space,
the robotic arm being configured to pick plants and/or products in the corresponding growing space and deposit them in the container of the drawer in its internal position,
the drawer further comprising a sterilization device configured to sterilize the container of the drawer, preferably by ultraviolet radiation, when the drawer switches from its external position to its internal position, the growing method including:
- using the controller to control the moving device so as to move the robotic arm of the growing space between the different corresponding plant locations and/or
- using the controller to control actions of the robotic arm of the growing space, the actions comprising a manipulation, by the robotic arm, of the plants and/or products of the plants arranged in the plant locations.

* * * * *